United States Patent [19]

Stewart

[11] 3,848,089
[45] Nov. 12, 1974

[54] APPARATUS AND METHOD FOR AUTOMATICALLY DIGITIZING LINE PATTERNS

[76] Inventor: Richard F. Stewart, 13027 Sky Valley Rd., Los Angeles, Calif. 90049

[22] Filed: May 21, 1973

[21] Appl. No.: 362,393

[52] U.S. Cl............................ 178/18, 340/146.3 AE
[51] Int. Cl............................................. G08c 21/00
[58] Field of Search ........... 340/146.3 AE, 146.3 H, 340/146.3 AG; 235/61.6 A, 61.6 B; 33/1 M; 318/577; 250/202; 178/18, 19, DIG. 3

[56] References Cited
UNITED STATES PATENTS

| | | | |
|---|---|---|---|
| 3,104,369 | 9/1963 | Rabinow et al............. | 340/146.3 H |
| 3,347,981 | 10/1967 | Kagan et al................. | 340/146.3 H |
| 3,403,263 | 9/1968 | Hargens............................ | 250/202 |

Primary Examiner—Thomas A. Robinson
Attorney, Agent, or Firm—Nilsson, Robbins, Bissell, Dalgarn & Berliner

[57] ABSTRACT

At least three sensors are transversely aligned in a first orthogonal direction to be scanned longitudinally in the other orthogonal direction along adjacent parallel scan paths to define a rectangular grid pattern. A scan sequence is begun at one corner of the grid pattern with the sensors aligned along one of the edges to be moved along three parallel grid lines at one of the longitudinal sides of the pattern. Upon completing a full scan at the opposite edge of the grid pattern, the sensors are transversely displaced to the next grid line inward to begin the next scan, and this is repeated after each successive scan in a regular indexing sequence until reaching the grid line at the opposite longitudinal side of the pattern to complete a scan sequence. Another scan sequence is performed in the same manner to move across the line illustration in the other orthogonal direction beginning at one corner with the sensors transversely aligned along one side to be scanned longitudinally across the grid pattern along adjacent parallel grid paths to the opposite side. The sensors are sequentially indexed to move transversely inward from the edge to the next adjacent line after each successive scan until reaching the opposite edge of the pattern.

In scanning longitudinally, the sensors detect the presence of transverse line segments. The sensor output signals are monitored for an indication of the beginning or end of a line, whereupon the orthogonal coordinates indicative of the position of the sensors on the grid pattern are generated and recorded. This information can then be sorted to provide digitized data indicative of the orthogonal location and the beginning and the end points of each line.

12 Claims, 4 Drawing Figures

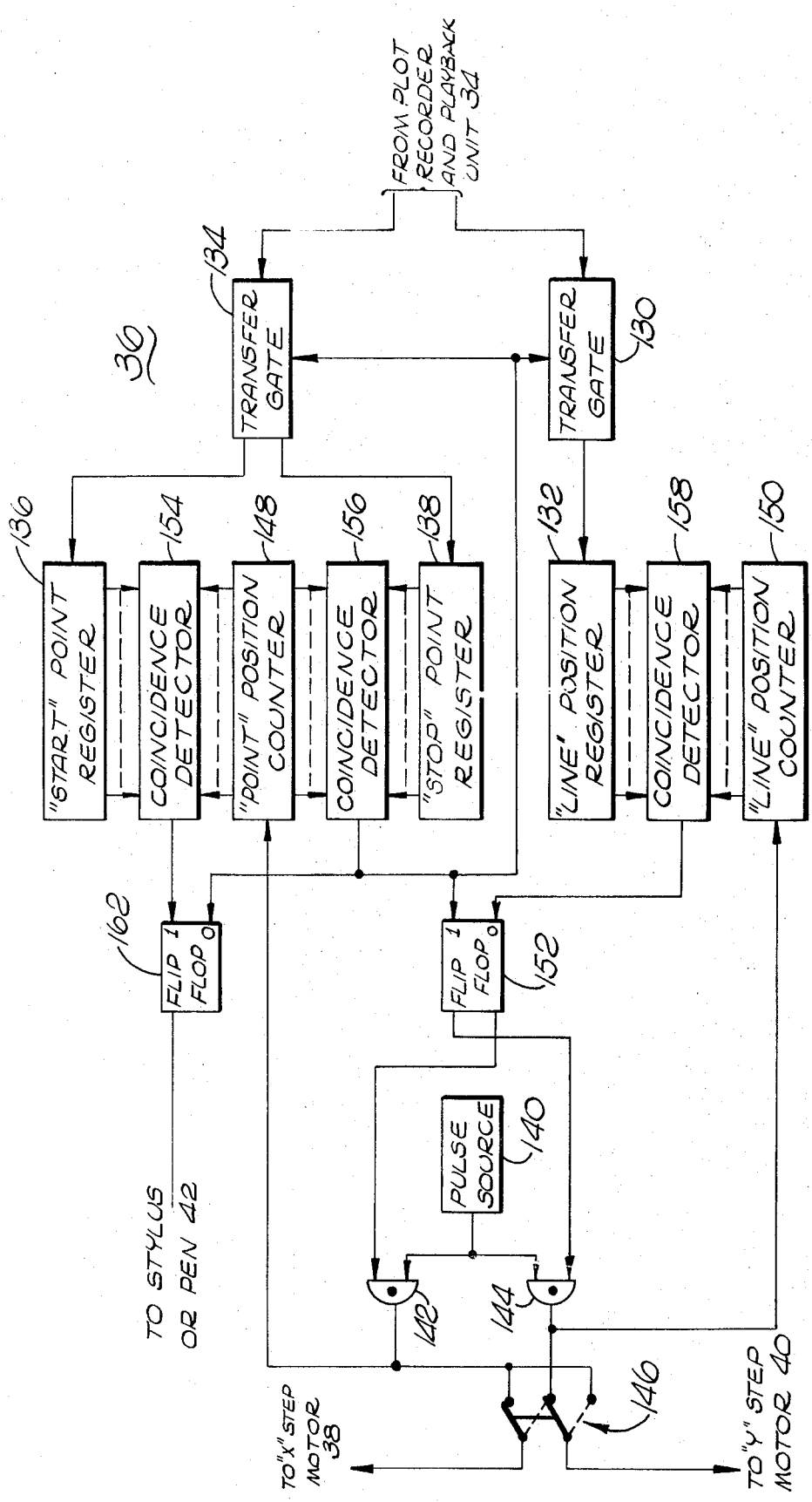

APPARATUS AND METHOD FOR AUTOMATICALLY DIGITIZING LINE PATTERNS

BACKGROUND OF THE INVENTION

This invention relates to a method of automatically digitizing lines, and, more particularly, to a method of automatically sensing and digitizing lines extending parallel to either of two orthogonal axes.

Certain graphical representations and design patterns consist of lines extending in only two orthogonal directions, that is, parallel to either of two mutually perpendicular axes. For example, diagrams of integrated circuit patterns and circuit board patterns are typically laid out in this manner with digital plotter techniques. The length and relative position of each line is reduced to a set of digital data to permit computer analysis and digital plotter reproduction of the line pattern.

Present methods for automatically digitizing lines generally employ either an automatic line follower system or a total grid recording system. With automatic line follower systems, complex sensor circuitry and servo-systems are required to follow the line, and in most cases servo motors maintain the sensors aligned along opposite edges of the line which is being followed and sensed. As the sensor element travels along a line, a continuous record of the coordinates traversed is generated. This mass of information must be stored for extensive indexing and sorting to derive the desired digitized information for each line. A computer or manual monitor, or both, must be employed to select between alternative courses to follow at line intersections, to determine further operations at the end of a line, and to make decisions in other instances. All of this requires complex and expensive circuitry, and the limitations of the servo system response make the line following operation extremely slow in most instances.

On the other hand, total grid recording systems employ large numbers of stationary sensors arranged in a grid pattern to detect the presence or absence of a line segment at each grid coordinate position. The output of each sensor is examined to determine whether a line is present and, if so, its beginning, end and direction. In such systems, not only must the data indicating the beginning and end of a line be recorded, but also the data indicating all intermediate points. This requires considerable data storage capacity, and much processing is necessary to determine the full pattern of the lines sensed. For example, no distinction between vertical and horizontal line ends is possible without subsequent processing to determine the direction of the line to which the particular line end belongs.

In contrast, the present invention operates to automatically digitize lines using a minimum of sensor apparatus and recording only certain pertinent information which permits automatic digitizing without the complex circuitry and control equipment of an automatic line follower system and without the large storage and complex data processing requirements of a total grid recording system.

SUMMARY OF THE INVENTION

A plurality of at least three sensors are scanned across the orthogonal line pattern to be digitized in both orthogonal directions to detect the opposite ends of each line segment.

In the preferred embodiment of the invention for digitizing orthogonal line patterns, three sensors are transversely aligned in a first orthogonal direction to be scanned longitudinally in a second orthogonal direction along adjacent parallel paths defined in a grid pattern overlying the line pattern to be digitized. After each longitudinal scan across the pattern, the sensors are displaced transversely inward to be indexed over to the next adjacent scan path. After completing a scan sequence over the entire line pattern, the sensors are transversely realigned in the second orthogonal direction to be moved longitudinally over adjacent grid parallel paths extending in the first orthogonal direction to be transversely indexed in sequence between successive scans until the entire grid pattern is scanned in that direction. Detection signals are generated as each sensor scans past transverse line segments. Digital values corresponding to the orthogonal coordinates of the grid pattern are maintained according to the position of the middle sensor to be recorded only when the combination of signals indicates the beginning or the end of a line segment. The recorded values can then be sorted to match the coordinates indicating the beginning of a line segment with those for the end of that same segment.

Thus, only beginning and end coordinates of each line segment need be stored since a line is known to exist between each such pair of coordinates. Thus, the need for expensive and complex circuitry, monitoring, and data storage facilities is eliminated while at the same time a highly accurate and efficient method of automatically digitizing lines is provided.

BRIEF DESCRIPTION OF THE DRAWINGS

The invention is more clearly understood from the following description taken in conjunction with the drawings wherein.

DETAILED DESCRIPTION

Figure 1:
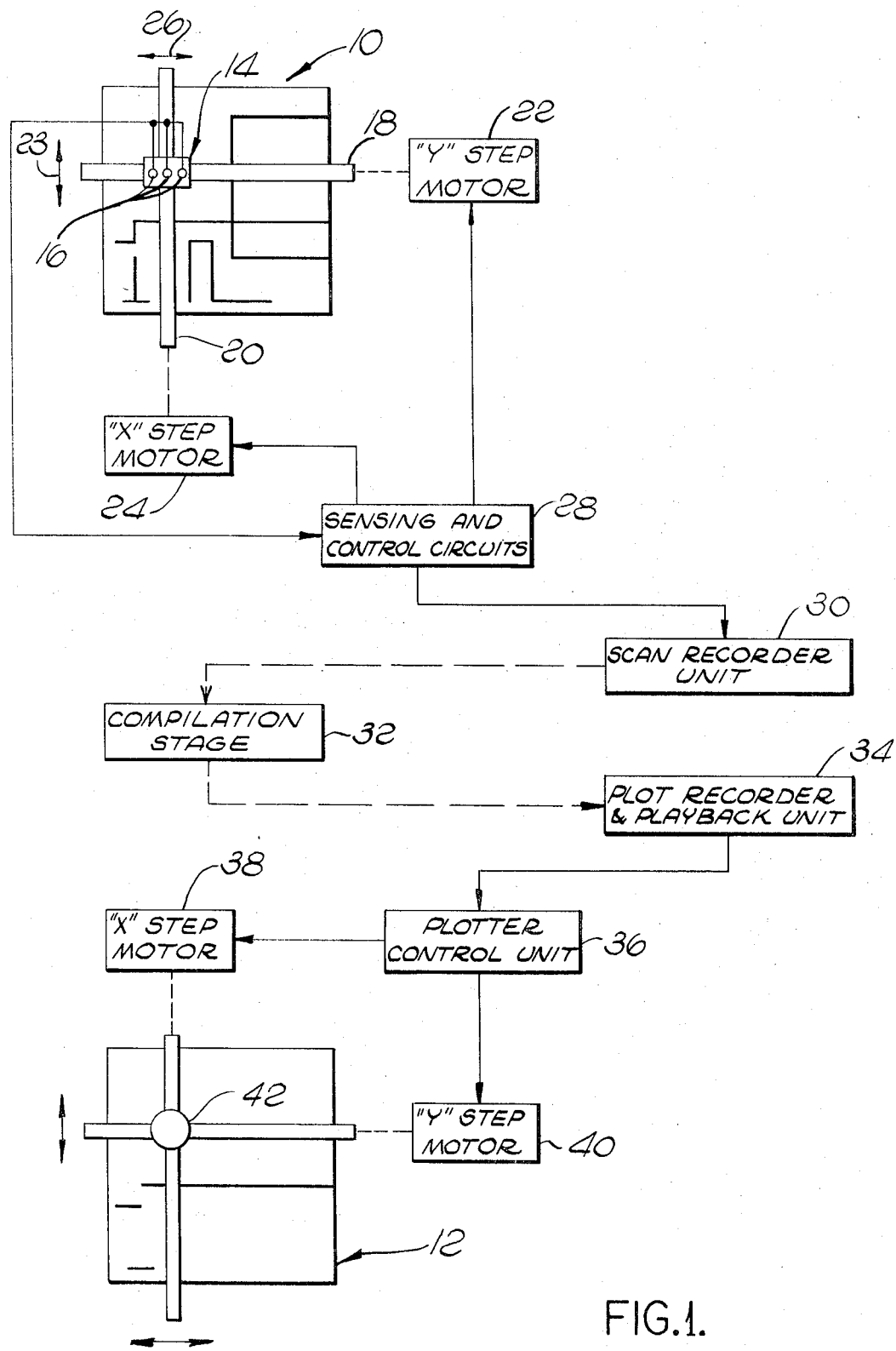
FiG. 1 is a schematic diagram, partially in block diagram form, showing the elements for a complete scanning and plotting operation for a line digitizing system in accordance with this invention.

Referring now to FIG. 1, a complete line digitizing system in accordance with the invention automatically scans an orthogonal line pattern on a master sheet 10 to produce a data record in compact digitized form that requires minimal storage and processing for reproduction of the original line pattern by conventional digital plotter techniques on a copy sheet 12. The line pattern on the master sheet 10 is digitized during a scanning operation in which a scanning assembly 14 containing three individual sensor elements 16 is moved relative to the pattern through a predetermined scanning path over the entire master sheet 10. During scanning, the sensor elements 16 are positioned side by side to be aligned in one orthogonal direction during scanning movement in the other orthogonal direction.

The sensor assembly 14 may be mounted on any suitable type of plotter carriage assembly, such as those employed in conventional flat bed or drum digital plotters, having step motors or the like for producing controlled movement in both orthogonal directions during a scanning sequence. In the drawings, a carriage assembly of the flat bed type is shown only schematically, as two mutually perpendicular arms 18 and 20 that converge at the scanning assembly 14. As shown in the drawings, a Y step motor 22 is coupled through appropriate linkage to the horizontal arm 18 to move it in either vertical direction, as indicated by the arrows 23, while an X step motor 24 is coupled through appropriate linkage to the vertical arm 20 to control movement in either horizontal direction, as indicated by the arrows 26. The sensor assembly 14 can thus be moved in predetermined increments in either orthogonal direction by actuation of the respective X and Y carriage assembly controls indicated by the cross arms 18 and 20.

The Y and X step motors 22 and 24 respond to drive signals from sensing and control circuits 28 which move the sensor assembly 14 through two successive scanning sequences, one in each coordinate direction, to define an orthogonal grid pattern. Sensing signals produced by the individual sensors 16 in scanning the line pattern on the master sheet 10 are supplied to the sensing and control circuits 28 which generate digitized coordinate position signals to be stored by a scan recorder unit 30.

Each complete scanning operation consists of two scanning sequences, one for each orthogonal direction. A scanning sequence is begun with the three sensors 16 aligned in one orthogonal direction along an edge at one corner of the master sheet 10. The sensor assembly 14 is then moved in the other orthogonal direction normal to that of the sensor alignment along the adjacent sheet edge until it reaches the opposite edge thus completing a single scan during which sensor elements 16 trace three parallel paths across the master sheet 10. Upon completion of each scan, the sensor assembly 14 is indexed or shifted one path width in the orthogonal direction of sensor alignment so that on the next scan the leading sensor element 16 in the direction of the shift scans over a new path while the two trailing sensors move along the two adjacent paths previously covered by the two leading sensor elements during the previous scan. The scan sequence continues in this manner with the sensor assembly 14 being indexed at the completion of each complete scan to shift the sensor elements 16 one sensing path until the lead sensor reaches the other edge of the master sheet 10. Thus, during each complete scan sequence, the sensors move over the entire master sheet 10 along numerous parallel sensing paths.

After completing the first scanning sequence, the sensors 16 are realigned relative to the master sheet 10 to begin a second scanning sequence in the other orthogonal direction along parallel sensing paths perpendicular to and crossing those of the preceding sequence. Thus, the parallel scan paths of one sequence crossing perpendicular to those of the other define the orthogonal grid pattern.

The sensor assembly 14 is selected to respond to the type of line pattern being sensed. For example, photoelectric sensor elements would be used for sensing visual line markings, and magnetic head sensor elements for line patterns formed with magnetic material. The spacing between parallel scan paths in the grid pattern depends upon the resolution to be achieved as determined by the width and minimum spacing of the lines in the pattern being reproduced. Generally, the lines should have a width substantially less than the spacing between the centers of adjacent parallel scan paths, and the minimum spacing between lines should be at least double the scan path spacing. The width of each scan path depends upon the transverse dimension of sheet area to which each sensor is instantaneously responsive, and should be limited to a dimension substantially less than the spacing between adjacent scan paths to avoid overlapping scans. With photoelectric sensors, the width of each scan path can be minimized using lenses or other optical systems for focusing a narrow spot area on the sheet onto the photoelectric cell. Magnetic sensor heads generally provided extremely small sensing gaps to achieve precise resolution. Where very close spacing between sensor elements 16 is difficult or overlap of sensing paths would occur, the individual sensor elements 16 might be aligned in the assembly 14 with a positional offset from one to the other along the scanning paths, and appropriate time delays or other position correlation circuits used to introduce a reverse offset in the sensor output signals or sensing circuit response to permit analysis as if aligned together.

The output signals from the individual sensor elements 16 during scanning are supplied to the sensing and control circuits 28 which, as more fully explained hereinafter, respond to each detection of the beginning or end of a line or line segment extending transverse to the scanning path. Upon detection of such a beginning or end point, the instantaneous location of the center sensor 16 on the grid pattern in appropriate X and Y coordinate values is stored in a scan recorder unit 30, along with data identifying the point as the beginning or end of a line. The record of individual points obtained in each scanning sequence can then be examined in a compilation stage 32 to determine the beginning and end of each line segment in the given orthogonal direction. This information is then reduced to a form descriptive of the line segment itself, which contains one value identifying the orthogonal coordinate along which the line extends and two other values indicative of the cross coordinates in the grid pattern where the line starts and where it ends. This line data in reduced form is recorded in the playback unit 34 to supply appropriate signals to a plotter control unit 36 in a conventional digital plotter arrangement where pulse signals delivered to an X step motor 38 and a Y step motor 40 move a stylus or pen 42, or other type of line marker, in orthogonal coordinate increments to reproduce the original line pattern of the master sheet 10 onto the copy sheet 12. The original pattern can be reproduced with the same size as the original, or in magnified or reduced form as desired, according to the incremental step size of the plotter relative to that of the scanning unit.

Figure 2:
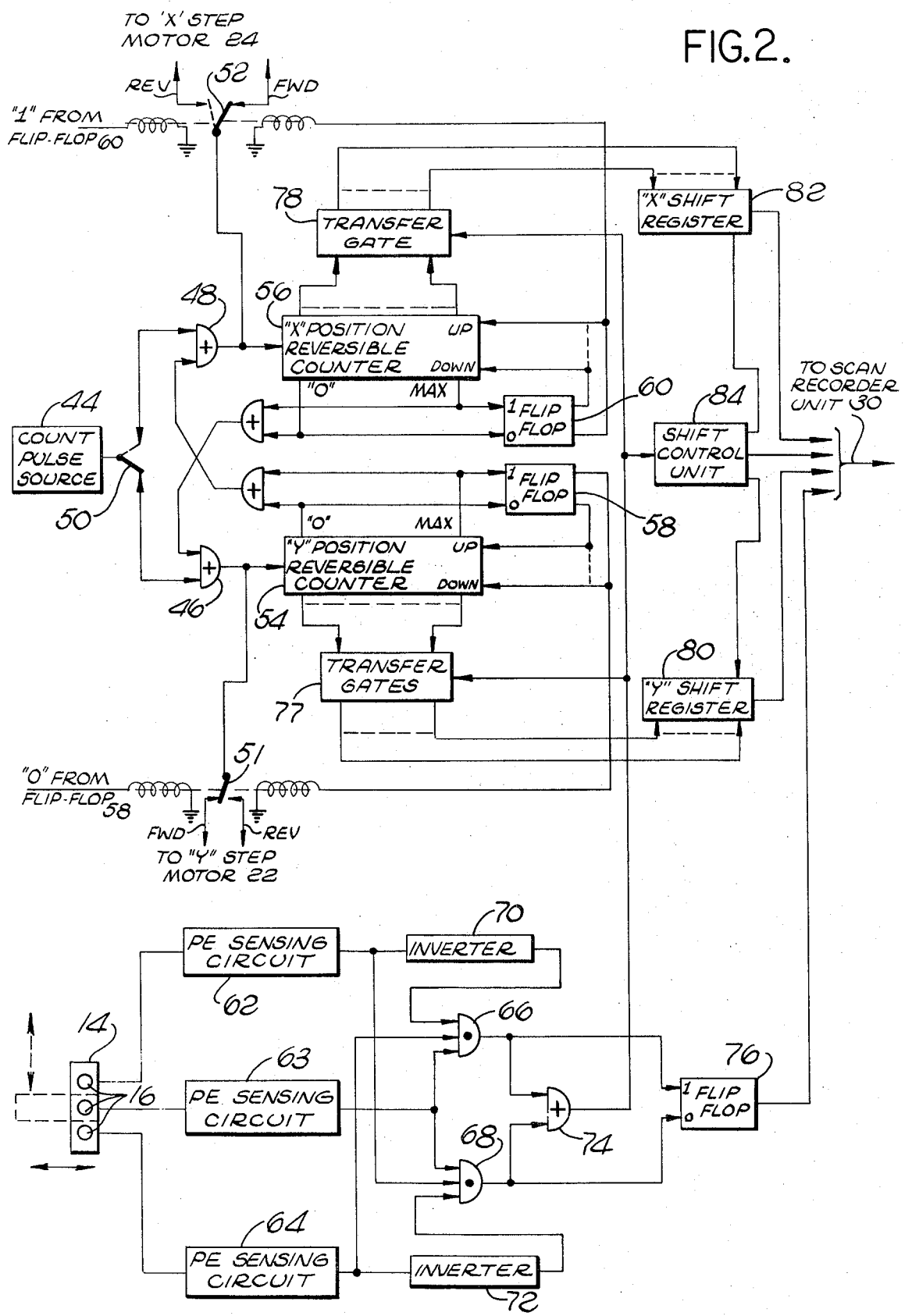
FIG. 2 is a schematic block diagram illustrating one form of the sensing and control circuits employed in the scanning operation of the line digitizing system of FIG. 1.

Referring now to FIG. 2, wherein the principal logic elements are schematically illustrated in block diagram form, the operations of the sensing and control circuits 28 in accordance with the invention are readily understood and appreciated by reference to a specific example of a suitable binary logic arrangement. Of course, it should be recognized by those skilled in plotter controls and associated logic arrangements that various other logic elements may be employed in performing the required functions, and the specific arrangements illustrated are merely exemplary.

A count pulse source 44 generates pulses at a repetition rate corresponding to the desired scanning rate, each pulse being intended to produce an incremental step motion of the carriage assembly 14. Count pulses from source 44 are applied to either of two OR gates 46 or 48 in accordance with the setting of a two position scan sequence selector switch 50, which is set in its lower position, as shown in the drawing, to effectuate the scan sequence producing parallel scan paths extending in the Y orthogonal direction, that is, vertically as shown in FIG. 1. Count pulses applied to the input of either OR gate 46 or 48 are delivered from the output through an associated two position, solenoid operated directional control switch 51 or 52, respectively, to drive the X and Y step motors 22 and 24 in either the forward or reverse direction.

The count pulses passing through OR gate 46 to drive the Y step motor are likewise applied to the input of a Y position reversible counter 54, while those passed by the OR gate 48 are in like manner applied to the input of an X position reversible counter 56. The Y and X position reversible counters 54 and 56 typically consist of a series of binary stages interconnected through either of two carry gating networks in accordance with "UP" and "DOWN" control signal outputs received from an associated flip-flop 58 or 60 so that each pulse causes the total count to increase or decrease by one. Counters 54 and 56 each have a maximum count capacity selected to equal the total number of incremental steps taken in moving the carriage assembly to complete a scan path in the particular orthogonal direction.

When the total pulse count in the counter 54 or 56 reaches the selected maximum capacity, a "MAX" output pulse is generated to be applied to the "1" input of the respective up-down control flip-flop 58 or 60 to change its state In the "1" state, the flip-flop 58 or 60 delivers a "DOWN" control signal to the associated counter gates to reverse its operation so that additional pulses applied at the input cause it to count downwards from the maximum to zero. Similarly, when the counter 54 or 56 reaches a "ZERO" count, a pulse is delivered to the "0" input of the respective flip-flop 58 or 60 switching it to its opposite state to remove the "DOWN" and apply an "UP" control signal so that the pulses received increase the count from zero towards the maximum. The outputs from the flip-flops 58 or 60, besides controlling the up and down counting operation of the counters 54 and 56, are also connected to the pair of solenoid control coils on either side of the moveable motor switch contacts 52 and 51 so that the pulses being counted are at the same time applied to the forward or reverse terminal of the respective X or Y step motor 22 or 24. For example, as the X position reversible counter 56 is counting upwards from 0 to the maximum, flip-flop 60 is in its 0 state so that the moveable contact on the X step motor controls switch 52 is connected to the forward terminal causing the X step motor 24 to move one incremental step in the forward direction with each pulse delivered through the OR gate 48. Thus, the X and y position counters 54 and 56 each maintain a binary count value indicative of the number of pulses delivered to the associated step motors 22 and 24 to move it in a particular direction along the selected orthogonal axis, thus providing instantaneous coordinate values determinative of the precise position of the sensor assembly 14 which may then be recorded when the sensor elements 16 detect the beginning or end of a line segment.

The opposite ends of a line segment are detected when two adjacent sensor elements 16, the middle one and either one of the other two, detect the presence of a line while the third does not. Each of the three sensing elements 16 operates with an associated sensing circuit 62, 63 or 64 to generate a detection output signal for succeeding logic elements. For example, with sensing elements that are photosensitive, the sensing circuits 62, 63 or 64 are conventional photoelectric (PE) circuits, as shown in FIG. 2, which may also include such timing and signal conditioning circuits as necessary to hold the output signal momentarily for coincidence detection at the completion of each scanning movement increment. The detection output signal from the sensing circuit 63 for the middle sensor element is applied as an input to both of two AND gates 66 and 68 used for detecting the two-out-of-three signal conditions indicative of the line ends. The output of sensing circuit 64 from the leading sensing element and an inverted output from the sensing circuit 62 from the trailing sensing element, which is applied through an inverter 70, are also applied as inputs to AND gate 66 to produce a START coincidence signal. Similarly, the other AND gate 68 receives at its inputs the trailing sensing element output from sensing circuit 62, together with an inverted output of the leading element sensing circuit 64 from an inverter 72 to produce a STOP coincidence signal. Both the STOP and START coincidence signals pass through an OR gate 74 to provide a detection gating signal to effectuate transfer of the X and Y coordinate values present in the Y and X position reversible counters 54 and 56 to be stored in the scan recorder unit 30. The individual START and STOP coincidence signals generated by AND gates 66 and 68 are applied to opposite inputs of flip-flop 76 to set it into its 1 or its 0 state, thus providing a signal indicating which end of a line segment has been detected.

A detection gating signal from OR gate 74 is applied as a control signal to open transfer gates 77 and 78 to transfer the coordinate position digit values present in the Y and X reversible counters 54 and 56 to associated Y and X shift registers 80 and 82. The detection gating signal is also coupled to actuate a shift control unit 84 that starts the scan recorder unit 30, and applies shift pulses to the shift registers 80 and 82 to transfer the digits serially to be recorded along with the single START or STOP digit from the flip-flop 76.

Figure 3:
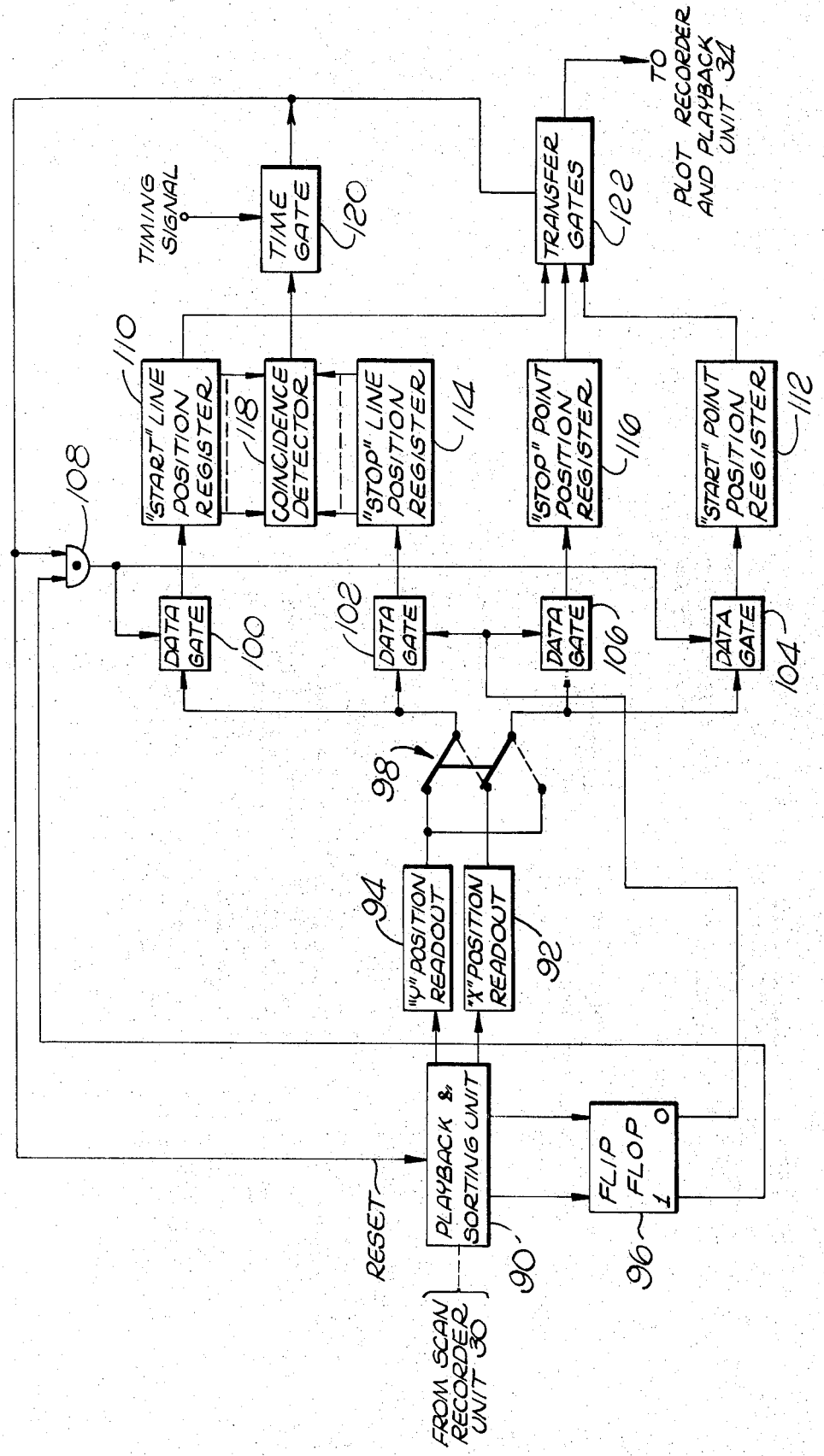
FIG. 3 is a schematic block diagram illustration of one form of an automatic compilation unit for use in line digitizing system of FIG. 1; and, FIG. 4 illustrates a form of a plotter control unit for use in a line digitizing system operation in accordance with FIG. 1.

The transfer gates 77 and 78 may constitute simply an individual gating circuit for each stage in the respective reversible counters 54 and 56. The gating signal from the OR gate 74 actuates each gating circuit to transfer the digit stored in the respective counter stage parallel with the others into respective stages into associated Y and X shift registers 80 and 82, which permit the binary digits indicative of the coordinate values to be shifted successively from stage to stage to the output. The digits representing the coordinate positions can thus be recorded serially in the scan recorder unit 30, which may be a magnetic tape, run or other serial recording unit. Of course, the scan recorder unit 30 might employ an active element memory having parallel access to different word address positions each capable of simultaneously storing all of the digits in parallel directly from the transfer gates 77 and 78, thus avoiding the need for intermediate storage in the Y and X shift registers 80 and 82 to convert the digital values from parallel to serial form for recording.

referring now to FIG. 3, upon completion of the scanning operation, the various STOP and START coordinate position values for each scan sequence are stored in the sequence of their detection on a magnetic tape, in successive word positions in a memory bank or the like so that they then can be compiled to combine the START and STOP positional values for each line segment. This is done, for example, by supplying the recorded information to a playback and sorting unit 90 that simultaneously reproduces the recorded X and Y coordinate digital values for each point. For example, the X and y values for a given point are typically recorded together as a block of data in two separate parallel tape tracks to be reproduced simultaneously by associated different playback heads through an X position readout 92 and a Y position readout 94. Prior to reproducing the digit values, each recorded data block is inspected to ascertain the value of the initial binary digit that indicates whether the point represented constitutes a START or a STOP position, and thus sets a control flip-flop 96 to its 1 or 0 state.

The actual X and Y digital values are reproduced to be routed through a double pole, double throw switch 98, or its electronic equivalent, that is initially set according to the scanning direction used for the particular scan sequence data being sorted. In other words, the setting of switch 98 depends on whether the line segments extend in the X or the Y coordinate direction. In particular, the switch 98 has its moveable contacts placed in the upper position, as shown in FIG. 3, for sorting the data recorded during a scan sequence carried out in the Y direction to detect line segments extending in the X direction. On the other hand, the alternative lower switch position is used for sorting information obtained from a scan sequence in the X direction used to detect line segments extending in the Y direction. With the switch 98 in the upper position as shown, binary digits indicative of the Y coordinate value, along which line segments in the X direction extend, are reproduced by the y position readout 94 to be applied as to inputs of a pair of data gates 100 and 102. At the same time, the X coordinate digits identifying the ends of the line are delivered to the input of data gates 104 and 106.

For each scan sequence recording, the playback and sorting unit 90 begins with the first START position information block recorded on the scan recorder unit 30. The single START indicator digit sets the flip-flop 96 into its binary one state to generate a 1 output that is applied through the initially enabled AND gate 108 to open the data gates 100 and 104. For a scan sequence in the X direction, the digits of the Y coordinate value for the first line segment are reproduced to be delivered by the upper contact of the scan selector switch 98 through the open gate 100 to the input "START" line position register 110 to be stored in serial order. At the same time, the reproduced digits of the X coordinate value that designates the starting point of the line are reproduced to be delivered by the bottom contact of switch 98 through the open gate 104 to be stored serially in a "START" point position register 112. This binary data block can be erased from the recording either during or after readout, or possibly tagged with an additional indicator bit that causes the system thereafter to ignore this particular block of information in succeeding operations.

With the "START" position data stored, the playback and sorting unit 90 begins a search routine to find the corresponding "STOP" position data for the other end of that particular line segment among the remaining blocks of information. Both the "STOP" line position register 114 and "STOP" point position register 116 are initially in a clear condition containing a zero or some other nominal digital value.

Preferably each of the line and point position registers 110, 112, 114 and 116 consist of a multiple stage binary shift register with a plurality of binary stages equal in number to the significant bits used to designate the orthogonal position values. A coincidence detector 118 for comparing the corresponding binary bits in the "START" and "STOP" line position registers 110 and 114, respectively, produces a positive coincidence signal output only when coincidence between all digits in the two registers indicate equality. Therefore, before each sorting operation begins, both line position registers 110 and 114 are in the cleared condition. The coincidence detector 118 produces the positive coincidence output. The output from the coincidence detector 118 is applied to the input of a time gate 120 that is enabled to pass the coincidence signal only when a timing signal is generated upon completing the transfer of the digital position values into the appropriate registers 110–116. The time gate 120 should operate as a sample and hold circuit to maintain the previous value of the coincidence detector output until receipt of the next timing signal, which can be generated by an appropriate counter output indicating that all digits have been entered in the position registers 110–116.

With the "START" line and point values entered in the respective registers 110 and 112, the coincidence detector 118 produces a negative or zero output signal to be applied by the time gate 120 to disable AND gate 108. This prevents application of the 1 output from the START-STOP flip-flop 96, which would maintain the data gates 100 and 104 open, and with them closed entry of additional data bits into the "START" line and point position registers 110 and 112 is prevented.

Thereafter, the playback and sorting unit 90 continues through successive blocks of information until reaching the first single unit 0 indicator signifying a "STOP" position value. This sets the START-STOP flip-flop 96 in its 0 condition to open the data gates 102 and 106. The digits of the Y position value are reproduced by the Y position readout 94 to be supplied by the upper contact of switch 96 through the open gate 102 to the "STOP" line position register 114. Similarly, the X position digits are reproduced by the X position readout to be applied by the lower switch contact through the open data gate 106 to be stored in the "STOP" point position register 116. When all bits for these digital values have been entered, the digits in the STOP line position register 114 are matched with those already in the "START" line position register 110, so that coincidence detector 118 can produce a positive coincidence signal output when the Y values in both registers are the same. If that happens, the positive coincidence output signal is applied by the time gate 120 to actuate the transfer gates 122, and also to the playback and sorting unit 90 to reset it to its initial position or simply indicate the occurrence of a coincidence.

In addition, the positive coincidence signal is applied by the time gate 120 to reopen the AND gate 108, thus permitting entry of the next "START" line and point position values into the registers 110 and 116, and to operate the transfer gates 122 to deliver the Y position digital value from the "START" line position register 110 (or the "STOP" line position register 114) to the plot recorder playback unit 34, along with the "START" and "STOP" point position values from the respective registers 112 and 116. Preferably, corresponding digits for these three coordinate values may be recorded in three parallel tracks on an appropriate magnetic tape recorder so that together they consititute a compact block of information for a complete line segment extending in the y orthogonal direction. Instead of tape techniques, the three different values may be stored in corresponding word positions where succeeding blocks can be sequentially addressed in an appropriate memory bank, or the like. In the meantime, the playback and sorting unit 90 can either be rewound or otherwise indexed to its initial starting position. However, the sorting operation should preferably merely continue from the previous "STOP" position recorded to obtain the next successive "START" position values to be entered in the registers 110 and 112, thereafter repeating the operation until another coincidence is achieved.

On the other hand, if the Y coordinate value entered into the "STOP" line position register 114 does not correspond to the "START" line position value already contained in the register 110, then the negative or zero coincidence output continues, so that the next time the single digit 0 indicator bit is encountered, the digit values in that block are entered into the "STOP" line and point position registers 114 and 116 to replace those previously tried. Thereafter each successive "STOP" line and point position values is entered from successive data blocks until the coincidence detector 118 produces a positive coincidence output.

Upon reaching the last data block in the scan sequence, the playback and sorting unit 90 may return to the initial position on the tape or memory bank to begin the process again with the next "START" data block not already processed, or, if desired, the system may be modified to review the entire scan sequence backwards performing a similar coincidence test in reverse order.

In some unusual instances, erroneous detections may occur due to the quality or orientation of the line pattern being arranged or the existence of a temporary malfunction or noise effect in the detector. If that happens, then a search of the remaining information blocks in a scan sequence may fail to locate a corresponding "STOP" position for a particular line segment. In that case, the system can simply be reset to repeat the search operation with the previously entered "START" line and point system values in the register 110 and 112 being cleared on the assumption that one of the digits may have been erroneously reproduced or registered. If a repetition of the operation again fails to produce the corresponding "STOP" position, the information block may be either eliminated from the scan sequence recorder as resulting from an erroneous detection, or retained for later analysis relative to any unmatched "STOP" position values at the completion of the sorting operation.

It may also be desirable with more intricate line patterns to have the capability of detecting and plotting single point line segments, but the possibility of erroneous detections in that case is increased. Such capability can be easily provided by adding an additional logic circuit to respond separately to a sensor condition where an output is received from the middle one of the sensors 16 with no output from either one of the opposite side. The coordinate positional values can then be separately recorded on a different scan recorder unit for single point values, or included with the line information on the regular scan recorder unit 30 together with the special marker signal to indicate that it is neither the end or the beginning of a line segment, but a special single point condition. To minimize erroneous detections, should this be a problem in the particular application, a detection occurring on one sweep in either orthogonal direction could be verified by a similar detection on the scan in the other orthogonal direction. Thus if the single point positions were recorded separately for sweeps in both orthogonal directions, each point position value could be verified using substantially the same coincidence matching technique involved in the compilation stage 32 as described more fully in connection with FIG. 3. In that case, a further coincidence detector would be employed to match the digital values in the "STOP" AND "START" point position registers 112 and 116 to perform in the same way as the coincidence detector 118 for matching the digital positional values in both coordinate directions.

The particular operations of the tape recording arrangement or memory bank in sorting each scan sequence need not be described in detail herein since various types of conventional data storage units are capable of operating in this manner and are well known to those skilled in the art of digital recording. Such functions as automatic resetting to the beginning of a recorded data sequence, separate storage and indexing of blocks of data and other control functions are readily understood and easily achieved with existing storage units in a variety of applications, and the particulars thereof are unnecessary to proper understanding of the novel features of this invention.

After completion of the sorting operation for each scan sequence, the individual line segments are each recorded or otherwise stored as successive blocks of information, each containing only the three digital position values, namely, the line coordinate value along which the segment extends and the two cross-coordinate values for the "START" and "STOP" points. This provides relatively compact line data information that may then be delivered to operate an appropriate plotter control unit 36 for a conventional digital plotter to reproduce the original orthogonal line pattern.

Referring to FIG. 4, the plotter control unit 36 may consist of various conventional types of computer operated controls, but with the simplified format of line information obtained from the previously described scanning and sorting operations, a simplified circuit arrangement can be used in controlling the operation of the plotter. In particular, the first block of recorded information representative of a line segment reproduced by a plot recorder and playback unit 34 is delivered through an associated transfer gate 130 to be entered into a line position register 132. Similarly, the "START" and "STOP" point digital values are individually reproduced to be entered through a corresponding transfer gate 134 to be entered respectively into a "START" point counter register 136 and a "STOP" point register 138. The individual digits of these orthogonal position values are preferably entered simultaneously in parallel into the appropriate stages of the registers 132, 136 and 138, but may be entered sequentially in a serial shift register type of operation, as may be desired.

Operating pulses for incrementing the position of the "X" and "Y" step motors 38 and 40 are selectively supplied through either of two AND gates 142 and 144 through separate ones of the switch contacts of a double poled, double throw switch 146 that is set in either of its two alternate positions in accordance with the scan sequence being reproduced. These pulses are also passed by the open AND gate 142 to the input of a point position counter 148 to increment the digital count contained therein, while those passed at other times by the AND gate 144 are similarly delivered to increment the digital count of a line position counter 150. The alternate routing of pulses through the AND gates 142 and 144 is controlled by the oppostie output states of a flip-flop 152. In particular, when the flip-flop 152 is in its 1 state, the output opens the AND gate 144, while closing the other AND gate 142; conversely, when in its 0 state, the AND gate 142 is opened, while the other AND gate 144 remains closed. The flip-flop 152 is a bi-stable multivibrator circuit that is switched from one state to the other upon receipt of an actuating signal on the associated input.

A first coincidence detector 154 compares the digits of the "START" point value stored in the register 136 with the digits of the instantaneous count value contained in the point position counter 148 to produce a positive coincidence output signal when these two values are equal. A second coincidence detector 156 likewise compares the instantaneous count value in the point position counter 148 with the digital coordinate value contained in the "STOP" point register 138 to generate a positive coincidence output when these two values are equal. Similarly, a third coincidence detector 158 compares the digits of the instantaneous count value in the line position counter 150 with the other coordinate values contained in the line position register 142 to generate a positive coincidence output when these two values are equal.

The coincidence output from the second coincidence detector 156 is connected to the 1 input of the control flip-flop 152. Thus when the instantaneous count in the point position counter 148 corresponds with the "STOP" value in the register 138, the flip-flop 152 is switched to its 1 condition to close the previously open AND gate 142 to prevent application of further count places to the point position counter 148. At the same time the previously closed AND gate 144 is opened to deliver count pulses to the line position counter 50 to increment the count value contained in it. On the other hand, when the instantaneous value in the position counter 150 reaches the same value as that stored in the line position register 132, the coincidence detector 158 delivers its output to the 0 input of the flip-flop 152, switching it to its 0 state to reopen the AND gate 142 so that additional count pulses reach the point position counter 148. Meanwhile, the AND gate 144 is closed to prevent further count pulses from changing the value in the line position counter 150.

These positive coincidence outputs from the coincidence detectors 154 and 156 are also applied separately to opposite inputs of a flip-flop 162 so that the output from the coincidence detector 154 places the flip-flop 162 into its 1 state to deliver an actuating signal to the stylus or pen 42 of the plotter causing it to begin marking the copy sheet 12. Of course, other kinds of plotters using digitally positioned lasers, light heads, electron beams and the like as line markers may also be so operated. Conversely, the coincidence output from the coincidence detector 156 returns the flip-flop 162 to its 0 state to lift the stylus or pen 42 from the copy sheet thus stopping the drawing of the line. The output from this coincidence detector 156 is also applied to open the transfer gates 130 and 134 upon completion of each line segment plot to permit entry of the digital point and line position information for plotting of the next line segment as indicated by the next succeeding block of information obtained from the plot recorder and playback unit 34.

In operation of the plotter control unit arrangement illustrated in FIG. 4, it is initially assumed that the data from a particular scan sequence carried out in the X orthogonal direction has been assorted and compiled for storage by recording on memory bank unit to be delivered from the plot recorder and playback unit to the plotter control unit 36. Prior to entering the initial block of information for plotting the first line segment of a scan sequence, or upon completing the plotting for previous line segment in the sequence, an enabling signal from the coincidence detector 156 opens the transfer gates 130 and 134 to enter the line position value and the "START" and "STOP" point values into the respective registers 132, 136 and 138. At the same time the coincidence output from detector 156 places the flip-flop 152 in its 1 state opening the AND gate 144 to supply pulses from the source 140 to the Y step motor 40 and to the input of the line position counter 150 to increment the count value. Thus, the count value maintained in the line position counter 150 represents the instantaneous orthogonal position of the stylus or pen 42 in the Y coordinate direction as it is moved in incremental steps by the actuating pulses delivered to the step motor 40.

Line position counter 150 may be of the type that returns to a minimum or zero count after reaching a maximum count value, while the stylus or pen 42 is returned to its initial or zero position. Alternatively, the line position counter 150 may be reversible type wherein the count value is decremented after reaching the maximum while the stylus or pen 42 moves in the reverse direction back to the initial or zero position. In either case, the count value in the line position counter 150 will eventually correspond to the digital value contained in the line position register 132 to indicate that the stylus or pen 42 has reached the proper Y coordinate along which the line segment being reproduced will extend. At that time the resulting output from the coincidence detector 158 switches the flip-flop 152 to its 0 state to prevent the application of further pulses to the line position counter 150 and the Y step motor 40, thus maintaining the carriage assembly properly aligned on the Y coordinate position designated by the digital line position value now contained in both the register 132 and the counter 150.

When the AND gate 144 closes to prevent passage of further pulses, the other AND gate 142 is open to permit application of incrementing pulses to the X step motor 38 and the point position counter 148. The count value in the point position counter 148 is incremented with each step movement of the stylus or pen 42 by the motor 38 until this count value is equal to the digital value contained in the "START" point register 136.

As with the line position counter 150, the point position 148 preferably should return to an initial or zero count after reaching a maximum at the same time the position of the stylus or pen 42 is returned to its initial or zero position. A reversible counter operation could be employed if the control logic is modified accordingly to take into account the fact that the "STOP" value could be reached before the "START" value, as should be obvious to those skilled in this art.

However, assuming an incrementing count, the value in the position counter 148 proceeds until the count value corresponds to the digits entered into the "START" point register 136. This indicates that the carriage assembly has moved the stylus or pen 42 along the proper Y coordinate until it has now reached the designated X coordinate "START" position to begin drawing the line segment. The positive coincidence output from the detector 154 switches the flip-flop 162 from its 0 to its 1 state to bring the stylus or pen 42 into marking contact with the copy sheet 12. Thereafter, signal pulses are delivered to the X step motor 38 and the counter 148 through the AND gate 142 to move the stylus or pen 42 in the X direction along the proper Y coordinate toward the "STOP" point indicated by the digital value stored in the associated register 138. When the count in the point position counter 148 reaches the designated "STOP" value, the entire line segment has been completed in one continuous motion, and a positive coincidence output from the detector 156 then returns the flip-flop 162 in its 0 state lifting the stylus or pen 42 from the copy sheet 12.

This "STOP" coincidence output from the detector 156 also switches the flip-flop 152 in its 1 state closing the AND gate 144 to switch the pulses from the X step motor 38 and its counter 148 to the Y step motor 40 and its counter 150. This coincidence output from the detector 156 also opens the transfer gates 130 and 134 to enter the next point and line positional values from the succeeding data block in the plot recorder and playback unit 34, at which time the operation is repeated.

If the blocks of line segment information have been sorted and compiled as suggested hereinbefore by merely continuing the scan sequence recording search to find the next succeeding "START" position value after detecting the appropriate "STOP" position, the operation of the plotter control unit arrangement as shown in FIG. 4 results in an efficient movement of the stylus or pen 42 from the end of one line segment to the start of another. Because the order of each scan sequence results in the positional values being recorded in the order of their point positions, and the next line segment may start on any given line coordinate, the carriage movement necessary to reach the proper "START" point coordinate position for drawing the next adjacent line segment is minimized.

It should also be appreciated that this digitizing method and system provides the capability of easily plotting lines extending at predetermined angles to the orthogonal axes chosen. In most instances, this can be accomplished most simply by rotating the master sheet being reproduced relative to the orthogonal scan directions about a defined rotational axis to the precise predetermined angle, thus placing the previously diagonal line segments parallel to one of the orthogonal axes of scan. In reproducing this information, the copy sheet is simply rotated through the precise same angle relative to the orthogonal axes of movement of the plotter. Alternatively, the digitizing operation might be carried out using appropriate time delays in detecting coincidence output from the individual sensors 16. For example, lines at 45° to the orthogonal axis could be sensed using a progressive time delay between the individual sensor outputs equal to the time needed to move from one to the next grid segment. However, this time delay operation would involve special modifications of the coincidence detection operation used in sorting and compiling the line information, as should be obvious to those skilled in the art.

It will be understood that the disclosed embodiments of this invention may be modified in many ways within the scope of the appended claims. In particular, it will be understood that the invention is not limited to the specific embodiment or components described herein.

What is claimed is:

1. A method for automatically deriving digital signals representative of an orthogonal line pattern comprising:

sequentially scanning said line pattern with repetitive longitudinal scans in each orthogonal direction to sense the presence of line segments at selected longitudinal positions along at least three adjacent parallel scan paths simultaneously with each scan being transversely shifted relative to said line pattern in a predetermined indexing sequence to longitudinally scan each succeeding set of three adjacent parallel scan paths forming an orthogonal grid pattern overlying said line pattern;

separately detecting opposite ends of each line segment of said line pattern to generate a first detection signal only when a line segment is detected during each scan in coincident longitudinal positions in at least two adjacent scan paths but not in another path adjacent thereto on one side and to generate a second detection signal only when a line segment is detected during each scan in coincident longitudinal positions in at least two adjacent scan paths but not in another path adjacent thereto on the side opposite said one side;

continuously maintaining first and second digital values indicative of the instantaneous longitudinal and transverse locations respectively of the successive positions being scanned in at least one of said scan paths; and providing a set of digital information output signals indicative of said first and second digital values during each scan only when either of said first or second detection signals is generated and providing a first or second identification signal indicative of said first or second detection signal, whereby said digital information output signals generated during scanning represent the orthogonal line pattern relative to said grid pattern.

2. The method of claim 1 further comprising the steps of:

successively recording as a block of information each set of digital information output signals and the associated identification signal generated during scanning in each orthogonal direction whereby said first and second digital values in each constitute longitudinal and transverse orthogonal coordinates of said grid pattern for each point at one or the other end of each line segment; and examining each successive block of information having the first identification signal in the sequence of its recording to match its first digital value with the next succeeding block having a corresponding first digital value and said second identification signal; and, recording said first digital value along with the different second digital values from both sets, whereby each line segment is defined to extend transversely along a longitudinal orthogonal coordinate corresponding to said first digital value with its opposite ends at two transverse orthogonal coordinates corresponding to the different second digital values.

3. The method of claim 1 wherein:

the scanning of said line pattern includes performing a first scanning sequence with repetitive longitudinal scans in one orthogonal direction followed by a second scanning sequence with repetitive longitudinal scans in a second orthogonal direction, continuously sensing during both sequences the simultaneous presence of line segments at transversely aligned longitudinal positions in three adjacent parallel scan paths and performing said predetermined indexing sequence to displace each successive longitudinal scan transversely by the width of one scan path to sense the presence of line segments in a next adjacent scan path whereby said scan sequences are each carried out by successive longitudinal scans progressing from one longitudinal edge of the grid pattern to the opposite longitudinal edge.

4. The method of claim 3 wherein:

said first and second digital values are indicative of the instantaneous longitudinal and transverse location of the position being scanned in the center one of said three adjacent parallel scan paths.

5. The method of claim 3 wherein:

said first detection signal is generated only when a line segment is simultaneously detected in the same longitudinal position both in the center path and in the adjacent outside path located in the direction of transverse shift, but not in the remaining outside path being scanned, to indicate detection of the starting end of the line segment; and, said second detection signal is generated only when a line segment is detected in said center and remaining outside paths, but not in the outside path located in the direction of transverse shift, to indicate detection of the end of a line segment.

6. The method of claim 1 wherein:

the scanning of said line pattern in each orthogonal direction consists of simultaneously moving three line sensing elements relative to said line pattern during each scan with each element responding to the presence of a line segment within a different one of three transversely aligned ones of longitudinal positions, whereby the movement of said elements relative to said line pattern defines said grid pattern.

7. The method of claim 1 further comprising:

controlling the scanning of said line pattern in the longitudinal direction in response to first control pulses each displacing the longitudinal position being sensed by a fixed distance increment relative to said line pattern and controlling said transverse shifting in response to second control pulses each shifting the transverse position being sensed by said fixed distance increment; and, separately counting the total of said first control pulses generated during each longitudinal scan and counting the second control pulses produced during scanning of said line pattern in each of said successive orthogonal directions to obtain said first and second digital values.

8. A system for automatically deriving digital signals representative of an orthogonal line pattern comprising:

a scanning assembly having at least three sensor elements each responsive to the presence of a line segment of said line pattern within a respective transversely aligned incremental area movable with respect to said line pattern;

scan control means coupled to said scanning assembly for simultaneously moving each of said incremental areas longitudinally together in a transversely spaced alignment along adjacent parallel scan paths relative to said line pattern and for transversely displacing each of said incremental areas to the next adjacent scan path upon completion of each longitudinal scan path to define successive parallel scan paths to perform a scanning sequence in each orthogonal direction providing an orthogonal grid pattern of scan paths overlying said line pattern;

digital register means responsive to said control means during each scan sequence for maintaining a first digital value indicative of the instantaneous transverse position of at least one of said incremental areas and for maintaining a second digital value indicative of the instantaneous longitudinal position of said incremental areas;

selective output logic means responsive to each of said sensor elements during each scan for generating a first output signal indicative of one end of a line segment only when the line segment is present simultaneously in selected adjacent ones but not another of said incremental areas and for generating a second output signal indicative of the other end of a line segment only when the line segment is present simultaneously in different adjacent selected ones but not another of said incremental areas; and, digital transfer means for generating during each scan output signals indicative of said first and second digital values in response to each of said first or second detection signals and for generating a first or second identification signal indicative of said first or second detection signal.

9. The system of claim 8 wherein:

said scanning assembly includes three transversely aligned sensor elements responsive to the presence of a line segment within respective ones of three transversely aligned spots constituting said incremental areas, said scanning assembly being movable relative to said line pattern during a scanning sequence in both said longitudinal and transverse directions.

10. The system of claim 9 wherein:

said selective output logic means includes a coincidence circuit coupled to receive sensing signals from each of said three sensor elements, said logic circuit generating said first output signal during each scan in response to a sensing signal from the middle one of said three sensor elements and a first one of the other sensor elements located on one side of said middle one but not from the second one on the other side thereof, and generating said second output signal during each scan whenever a sensing signal is received from said middle one and said second sensor elements, but not from said first one.

11. The system of claim 8 wherein:

said scan control means includes means responsive to the completion of each longitudinal scan for indexing said scanning assembly in a predetermined transverse direction by a distance equal to the transverse spacing between the sensing spots of adjacent sensor elements, whereby each sensor element after said indexing is responsive to the presence of line segments in a scan path next adjacent to that of its corresponding preceding scan path.

12. The system of claim 8 further comprising:

recording means coupled to said digital transfer means and responsive to said output signals for recording said first and second digital values and said first or second identification signal in the serial order generated during each scan sequence, whereby said digital values having said first detection signals mays be matched with the corresponding digital values having said second detection signals to determine the opposite ends of each line segment in said line pattern for each orthogonal direction.

* * * * *

UNITED STATES PATENT OFFICE
CERTIFICATE OF CORRECTION

Patent No. 3,848,089　　　　　　　　Dated November 12, 1974

Inventor(s) Richard F. Stewart

It is certified that error appears in the above-identified patent and that said Letters Patent are hereby corrected as shown below:

Column 4, line 18, "provided" should read -- provide --. Column 5, line 39, after "state", first occurrence, insert a period -- . --; line 49, "or" should read -- and --; line 63, "y" should read -- Y --. Column 6, line 13, "or" should read -- and --; line 39, between "of" and "flip-flop" insert -- a --; line 64, "run" should read -- drum --. Column 7, line 6, "referring" should read -- Refferring --; line 17, "y" should read -- Y --; line 45, "y" should read -- Y --. Column 8, line 49, "unit" should read -- digit --; line 63, between "that" and "coincidence" insert -- the --. Column 9, line 17, "y" should read -- Y --; line 53, "arranged" should read -- scanned --; line 60, delete "system". Column 10, line 10, "of" should read -- on --. Column 11, line 25, "oppostie" should read -- opposite --; line 57, "places" should read -- pulses --. Column 12, line 51, between "be" and "reversible" insert -- a -- Column 13, line 11, before the numeral "148" insert -- counter

UNITED STATES PATENT OFFICE
CERTIFICATE OF CORRECTION

Patent No. 3,848,089     Dated November 12, 1974

Inventor(s) Richard F. Stewart

It is certified that error appears in the above-identified patent and that said Letters Patent are hereby corrected as shown below:

Page - 2

--. Column 18, line 15, "mays" should read -- may --.

Signed and sealed this 4th day of February 1975.

(SEAL)
Attest:

McCOY M. GIBSON JR.
Attesting Officer

C. MARSHALL DANN
Commissioner of Patents